United States Patent

[11] 3,579,750

[72] Inventors Erich Carbon
 Fallersleben;
 Wolfgang Wagner, Weyhausen, Germany
[21] Appl. No. 865,452
[22] Filed Oct. 10, 1969
[45] Patented May 25, 1971
[73] Assignee Volkswagen Aktiengesellschaft
 Wolfsburg, Germany
[32] Priority Oct. 15, 1968
[33] Germany
[31] P 18 03 151.1

[54] LOCK FOR SAFETY BELTS
 2 Claims, 2 Drawing Figs.
[52] U.S. Cl. .................................................. 24/230
[51] Int. Cl. .................................................. A44b 11/26
[50] Field of Search .................................................. 24/230.1
 (U), 230.1, 230.1 (T)

[56] References Cited
UNITED STATES PATENTS

| | | | |
|---|---|---|---|
| 1,548,023 | 8/1925 | Cowell | 24/230.1-TUX |
| 2,694,244 | 11/1954 | Nolan | 24/230.1-UUX |
| 3,252,195 | 5/1966 | Selnes | 24/230.1-UUX |

FOREIGN PATENTS

| | | | |
|---|---|---|---|
| 1st Addition 85,148 | 5/1965 | France | 24/230.1-U |
| 1,382,308 | 5/1965 | France | 24/230.1-U |
| 1,371,973 | 8/1964 | France | 24/230.1 |
| 1,122,920 | 8/1968 | Great Britain | 24/230.1-UUX |
| 1,123,686 | 8/1968 | Great Britain | 24/230.1-U |

*Primary Examiner*—Bernard A. Gelak
*Attorney*—Watson, Cole, Grindle & Watson

ABSTRACT: The invention relates to a lock member for safety belts having a locking link and a spring in the member with the spring composed of two portions of which one end abuts a release actuator and the other end abuts the end of the belt.

PATENTED MAY25 1971 3,579,750

INVENTORS
E. Carbon
BY W. Wagner

Watxm, Cole, Grindle + Watxm
Attxs.

LOCK FOR SAFETY BELTS

This invention relates to a lock for safety belts as particularly in use in connection with power vehicles. The invention is based on a lock principle in which a slide latch is to be inserted into a flat lock housing, whereby the slide latch will be under the influence of a spring and a locking link in which the spring is operative not only in connection with the locking link, but also with the slide latch member which forms a part of the safety belt.

In connection with such devices spring means have been devised in which the slide flap is held under tension so that the slide flap upon release from the locking member will be at least partly forced out of the locking housing and thus this will facilitate and make it easier to remove the safety belt.

It is an object of the present invention to simplify and to make the belt lock less costly, by providing a spring in the lock housing to not only influence the locking link but also abut against the end portion of the safety belt.

Figure 1:
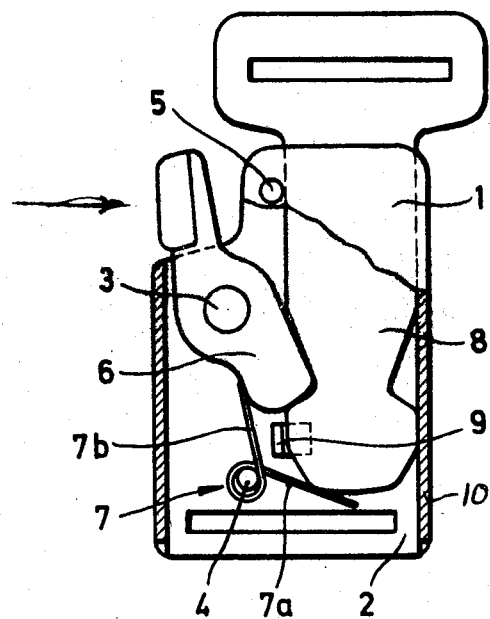
Figure 2:
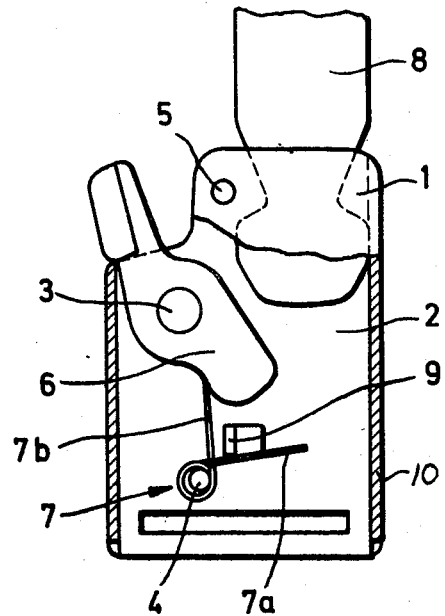

Further objects of the invention will be apparent from the following description when considered in connection with the accompanying drawing in which;

FIG. 1 is a side view partly in section showing the mechanism in the locked portion with the end of the safety belt, and FIG. 2 is a similar view showing the safety belt in the released position.

The lock housing 10 consists of two opposite plate members 1 and 2 with a small space between them and these plate members are held together by pins or rivets 3, 4 and 5. The pin 3 serves the additional purpose of providing a bearing member for the locking link 6, which latter is composed of a two-armed lever. The pin 4 forms the bearing portion for a double spring 7 which latter has arms 7a and 7b and the third pin or rivet 5 operates as a guide element for the slide link portion 8 of the safety belt.

The lock housing has at one side an opening through which the operating end of the lock link lever 6 projects. The link or lever 6 is thus a part of the lock itself and in the position when the lock is not in use to receive the end of the safety belt, the end portion 7a of the spring 7 will abut against a stop member 9 secured to the side member 2 of the casing as shown in FIG. 2 of the drawing. The end portion 7b of the spring will constantly be forced against the link portion of the actuator 6. Upon the insertion of the slide member 8 into the lock casing, the two end spring portions 7a and 7b will be tensioned as shown in FIG. 1 and when the belt is removed, the spring portion 7a will tend to force the end portion 8 of the safety belt out of the lock casing. Thus the spring 7 by means of its two straight end sections 7a and 7b, a double function will be achieved of which one is its tendency to aid in removing the lock member on the end of the safety belt, and with the other member 7b to maintain the position of the release member 6.

By pushing on the actuator 6 in the direction of the arrow, FIG. 1, the belt link 8 will be released urged upwardly or outwardly by the spring portion 7a.

We claim:

1. A lock for a safety belt, especially for motor vehicles, comprising a flat lock housing, a sliding clip having a shoulder on its edge insertable into said housing, a catch in the lock housing generally coplanar with said clip when inserted and engaging laterally with said shoulder on the inserted sliding clip, a spring provided in a plane of the catch to assure both the engagement of the catch and at the end of the inserted sliding clip, so that the latter upon release of the engagement of the catch will rest thereon thereby pushing it out of the lock housing, the spring being in the form of a spring with two legs starting out from a common spiral, said legs enclosing an angle between them which tend to decrease under the action of the spring force, and both the catch and the end of the inserted sliding clip lying inside the angle forming a support for each of the legs.

2. A lock according to claim 1, in which a stop is provided arranged on the lock housing and displaced in the direction of movement of the sliding clip so that it will be effective only when the sliding clip has been pushed out of the lock housing and which assures a spring force which presses the catch by means of the leg of the spring constantly resting thereon into the path of movement of the sliding clip and a leg of the spring resting on the end of the inserted sliding clip.